United States Patent
Ekpar

(10) Patent No.: US 7,567,274 B2
(45) Date of Patent: Jul. 28, 2009

(54) METHOD AND APPARATUS FOR CREATING INTERACTIVE VIRTUAL TOURS

(76) Inventor: Frank Edughom Ekpar, Matsungaga 1-17-26, Ikki-Machi, Aizu-Wakamatsu City, 965-0001 (JP)

( * ) Notice: Subject to any disclaimer, the term of this patent is extended or adjusted under 35 U.S.C. 154(b) by 300 days.

(21) Appl. No.: 10/728,609

(22) Filed: Dec. 3, 2003

(65) Prior Publication Data

US 2004/0169724 A1    Sep. 2, 2004

Related U.S. Application Data

(60) Provisional application No. 60/432,459, filed on Dec. 9, 2002.

(51) Int. Cl.
*H04N 5/232* (2006.01)
(52) U.S. Cl. .................................................. 348/211.9
(58) Field of Classification Search .................. 348/36, 348/38, 39, 47, 143, 147, 207, 284, 294, 348/211.9, 333.01; 382/154, 284, 296; 350/441; 358/87, 108, 209
See application file for complete search history.

(56) References Cited

U.S. PATENT DOCUMENTS

| | | | | |
|---|---|---|---|---|
| 4,566,763 | A * | 1/1986 | Greguss | 359/725 |
| 5,130,794 | A * | 7/1992 | Ritchey | 348/39 |
| 5,185,667 | A * | 2/1993 | Zimmermann | 348/207.99 |
| 5,444,478 | A * | 8/1995 | Lelong et al. | 348/39 |
| 5,657,073 | A * | 8/1997 | Henley | 348/38 |
| 5,721,585 | A * | 2/1998 | Keast et al. | 348/36 |
| 5,960,108 | A * | 9/1999 | Xiong | 382/154 |
| 5,990,941 | A * | 11/1999 | Jackson et al. | 348/36 |
| 6,226,658 | B1 * | 5/2001 | Smith | 715/517 |
| 6,545,685 | B1 * | 4/2003 | Dorbie | 345/582 |
| 7,009,652 | B1 * | 3/2006 | Tanida et al. | 348/340 |
| 2003/0197780 | A1 * | 10/2003 | Iwaki et al. | 348/36 |

* cited by examiner

*Primary Examiner*—Tuan V Ho
*Assistant Examiner*—Kent Wang

(57) ABSTRACT

The present invention discloses a method and apparatus for creating interactive virtual tours. In one embodiment, panoramic imaging systems characterized by a 360-degree lateral field of view and a vertical field of view that is usually less than 180 degrees are utilized and polynomial-based interpolation algorithms are used to correct distortions in the input panoramic images, video or rendered scenes, permitting the use of an arbitrary panoramic imaging system characterized by the ability to generate a seamless 360-degree panoramic view of the imaged scene in each single image frame. The input panoramic images, video or rendered scenes are used to create spherical environment maps that are packaged into completely immersive (giving the impression of being there) virtual tours that are rendered on a display device by a viewing engine that corrects perspective distortions in the spherical environment maps contained in the virtual tour packages and permits a plurality of viewers to view any portion of any of the panoramic scenes in the virtual tour package in a manner that is free from distortions. The present invention also discloses a control engine for representing the individual panoramic scenes contained in the virtual tour package in multi-dimensional space and/or time and for transmitting control signals to the viewing engine that cause the viewing engine to render any particular panoramic scene selected by the viewer and any view window on the selected panoramic scene desired by the viewer. Furthermore, the control engine communicates bi-directionally with the viewing engine and provides a means of indicating which particular panoramic scene is currently viewed by the viewing engine as well as a means of indicating what portion of the selected panoramic scene is currently displayed by the viewing engine.

44 Claims, 11 Drawing Sheets

*Distorted Panoramic Annular Image*

*Panoramic Annular Lens System*

METHOD AND APPARATUS FOR CREATING INTERACTIVE VIRTUAL TOURS

CROSS-REFERENCE TO RELATED APPLICATIONS

This U.S. Non-Provisional Application claims the benefit of U.S. Provisional Application Ser. No. 60/432,459, filed on Dec. 9, 2002, herein incorporated by reference.

BACKGROUND OF THE INVENTION

1. Field of the Invention

The present invention relates generally to the fields of image processing for correction of image distortion produced by a wide-angle lens or simulation of a wide-angle lens and the creation of navigable virtual tours comprising primarily of panoramic images or video. In one embodiment, the invention relates to a system permitting the creation of immersive spherical environment maps from the class of panoramic imaging systems characterized by a 360-degree lateral field of view and a vertical field of view that is usually less than 180 degrees and the creation of navigable virtual tours comprising primarily of such spherical environment maps. The invention permits the use of an arbitrary lens in the aforementioned class of lenses for capturing the source panoramic scenes. In this context, a virtual tour refers to an interactive environment consisting of one or several (possibly interconnected) panoramic scenes (video, still or rendered) usually represented as cylindrical or spherical environment maps.

2. Description of the Prior Art

When creating navigable virtual tours, it is desirable to use a panoramic image acquisition system that encodes as much visual information as possible in a single image frame and that does so without any moving parts. Several methods of acquiring panoramic images exist. One solution involves using an orientation-sensing device to sense the orientation of the user and then using the input to rotate a conventional camera to cover the field of view indicated by the user's orientation. Such a system is described in U.S. Pat. No. 4,728,839. Apart from the obvious handicap of not being able to permit more than one user to comfortably navigate the remote scene, the inherent delay between the transmission of the orientation signal and the positioning of the camera to coincide with the desired orientation severely limits the practical value of this system. A more elegant solution to the problem is to use a wide-angle lens system. The fish-eye lens system described in U.S. Pat. No. 5,434,713 remedies some of the limitations of the conventional lens and camera system.

One class of wide-angle lens system permits the entire 360-degree lateral visual space around the user to be imaged in a single image frame. Although the vertical field of view of such systems can in principle be up to 180 degrees (providing a completely immersive panoramic scene), most practical systems of this type usually have a vertical view field that is less than 180 degrees. In this disclosure, this class of lens systems will be referred to as panoramic annular lens systems since they produce a donut-shaped, annular panoramic image. Two examples of panoramic annular lens systems are disclosed in U.S. Pat. Nos. 4,566,763 and 6,459,451. Wide-angle imaging systems generally suffer from inherent (predictable) perspective distortion and so for the images they produce to be viewed comfortably by a human being, they need to be de-warped. Several solutions to the perspective distortion problem exist. One such solution is disclosed in U.S. Pat. No. 5,185,667. The '667 patent describes a system utilizing complicated trigonometric transformations and assuming a mathematically ideal fish-eye lens. The solution described in U.S. Pat. No. 6,005,611 remedies some of the limitations of the system presented in the '667 patent. The 611 patent uses control points obtained via a set of projection equations and a global bivariate polynomial to correct the perspective distortion of the fish-eye lens.

Several products (including Apple Computer's QTVR Authoring System) utilize image-stitching techniques to stitch several (possibly overlapping) conventional images in a tedious and error-prone (due to disparities in the characteristics of the individual image segments used) procedure to create cylindrical or spherical environment maps for the creation of virtual tours. U.S. Pat. No. 5,396,583 discloses a perspective-correction algorithm for cylindrical environment maps.

The system disclosed in U.S. Pat. No. 5,990,941 remedies some of the limitations of the image-stitching methods by using one or two fish-eye images to create spherical environment maps. The system described in the '941 patent is also limited by the tediousness and inaccuracies of the image-stitching process. Furthermore, attempting to use the system described in the '941 patent to create spherical environment maps containing video would require the use of at least two video cameras and additional equipment to control and combine the output from the two video cameras.

SUMMARY OF THE INVENTION

It is an object of the present invention to overcome the limitations of the prior art set forth above by providing a vastly improved method and apparatus for creating interactive virtual tours. In one embodiment, the present invention utilizes panoramic imaging systems (panoramic annular lens systems) characterized by a 360-degree lateral field of view and a vertical field of view that is usually less than 180 degrees and producing a donut-shaped panoramic annular image as output in the creation of spherical environment maps. An environment map, in the context of this disclosure, refers to a specification of visual information for a set of locations in a scene such as that contained in a digitized image, video or rendering of the scene.

Advantages of utilizing the aforementioned class of panoramic imaging systems include:

The entire 360-degree lateral field of view around the user is captured in a single image flame.

There are no moving parts. This permits both still image and video capture in a simple and cost-effective manner.

There is no need to use a tedious, error-prone procedure to stitch images. A single image flame covers the entire 360-degree lateral field of view.

It is a further object of the present invention to provide a method and apparatus for creating spherical environment maps from images acquired using panoramic annular lens systems or simulations thereof and to provide fast polynomial-based interpolation means of correcting non-linear radial and tangential distortions as well as other distortions in the source panoramic images.

This has the following advantages:

An arbitrary panoramic annular lens system with an arbitrary radial and tangential distortion pattern can be used to generate source panoramic images for the creation of the spherical environment maps.

The use of fast polynomial-based interpolation algorithms to correct non-linear radial and tangential distortions permits this invention to be used to construct spherical environment maps at real-time rates (typically 30 image frames per second) on an average personal computer.

It is yet another object of the present invention to provide a means of both automatically and interactively calibrating the donut-shaped annular images produced by the panoramic annular lens system. Calibration, as used in the context of the present invention, refers to the process of determining the position of the center, the inner ring and the outer ring of the annulus that comprises the panoramic scene in the image frame captured by the panoramic annular lens system.

It is yet an object of the present invention to permit the importation of spherical and cylindrical environment maps and to facilitate conversions between the cylindrical, spherical and other formats when necessary.

It is another object of the present invention to provide a means of packaging a plurality of spherical environment maps into an interactive virtual tour that can be exported to a viewing engine.

It is a further object of the present invention to provide a viewing engine implementing a means of permitting a user to interactively select any desired spherical environment map in the virtual tour package, and further, any desired view within the selected spherical environment map and performing perspective corrections on the selected view in order to present the user with a view window that is free from perspective distortions. The present invention permits a plurality of users to independently and simultaneously navigate and interact with the virtual tour package.

With regard to the viewing engine, it is an object of the present invention to provide a fast, simple, yet adequate (providing full pan, tilt and zoom controls) means of performing perspective correction of any selected portion of the spherical environment map.

It is also an object of the present invention to provide a means of constructing spherical environment maps from images captured with panoramic annular lens systems in a manner that permits panoramic images from panoramic annular lens systems with an asymmetrical vertical field of view (the maximum viewing angle above the horizon is not equal to the maximum viewing angle below the horizon) to be represented correctly.

It is yet another object of the present invention to provide a control engine representing all or some spherical environment maps in a virtual tour package in 3- or 2-dimensional space and permitting user interaction with this representation so that control signals could be sent to the viewing engine to cause it to select a particular spherical environment map in the virtual tour package for viewing and to select any desired view within selected spherical environment map. Bi-directional communication between the control engine and the viewing engine permits the control engine to indicate the selected spherical environment map and the selected view on the selected spherical environment map.

These and other objects, features and advantages of the present invention will be more clearly understood in the description of the preferred embodiments.

DETAILED DESCRIPTION OF THE PREFERRED EMBODIMENTS

Figure 1:
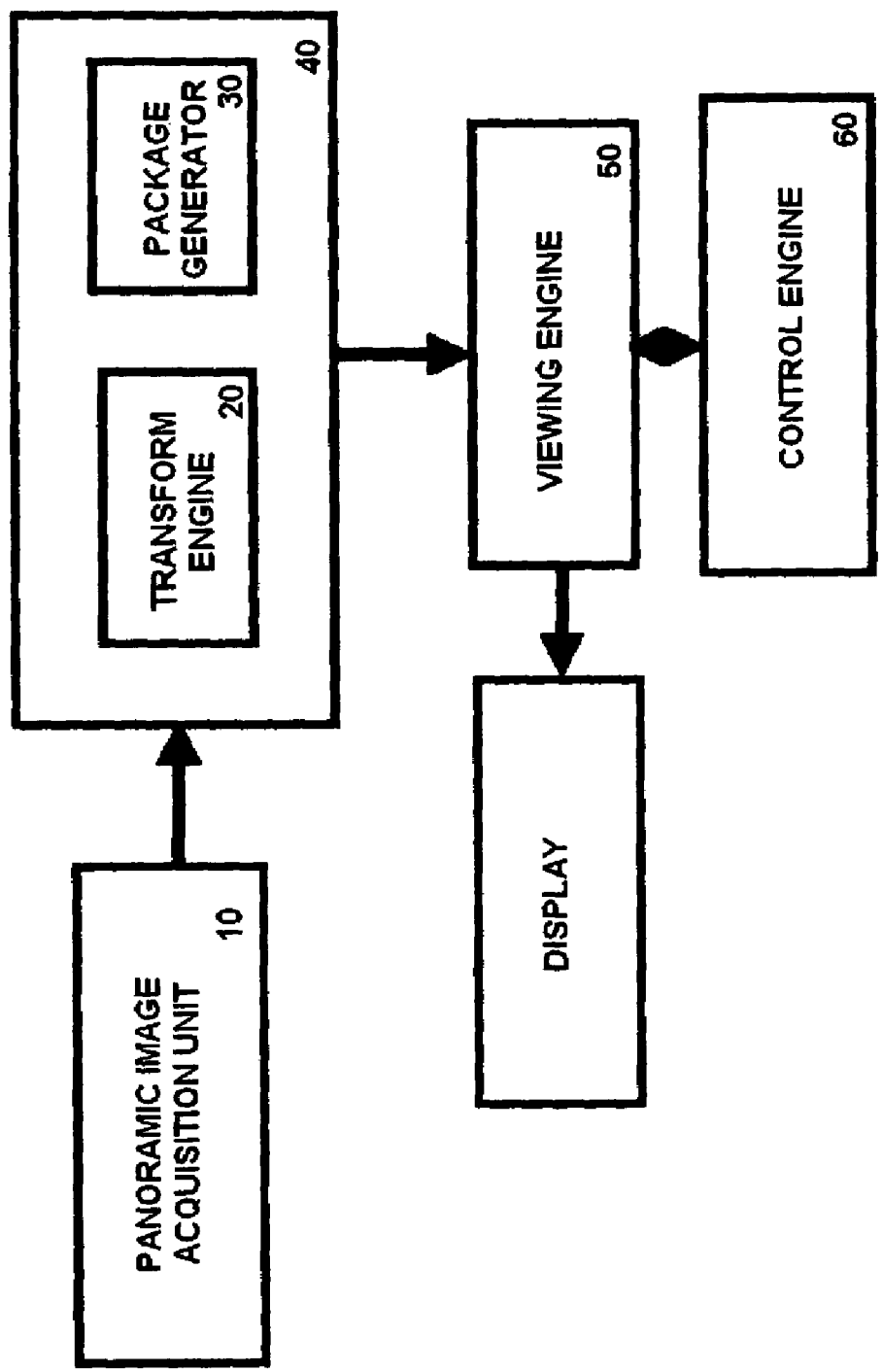
FIG. 1 is a block diagram of the preferred embodiment of the present invention.
Figure 2:
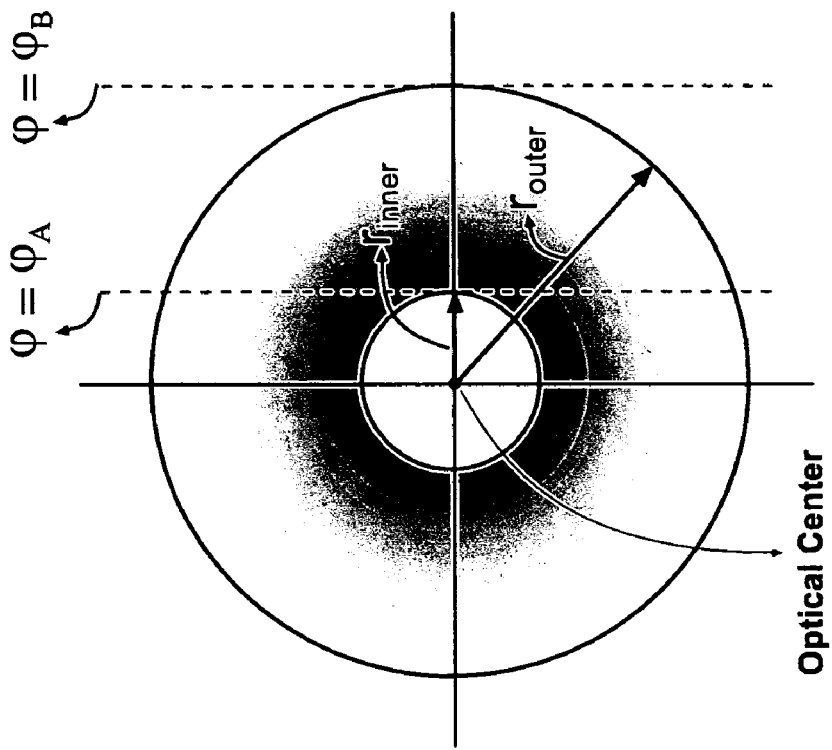
FIG. 2 illustrates the nature of a panoramic annular lens system (in a vertical cross-sectional view) and the distorted panoramic annular image it generates.
Figure 2:
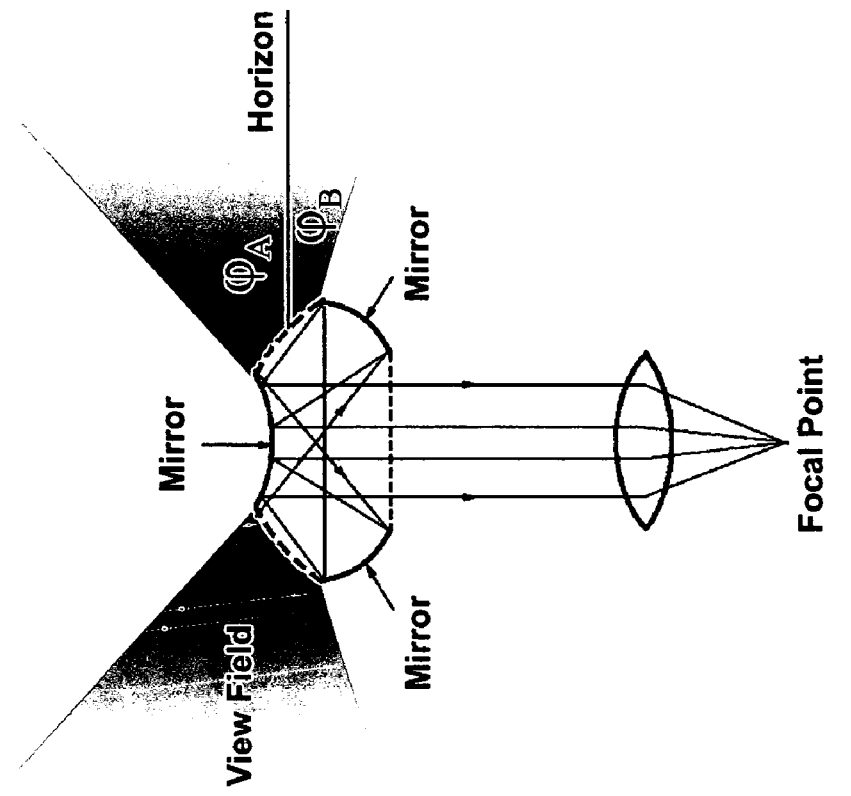

Referring now to FIG. 1, a block diagram showing the main components of the preferred embodiment of the present invention, the panoramic image acquisition unit 10 consists of a panoramic annular lens (such as the one disclosed in U.S. Pat. No. 4,566,763) and a still image or video camera. The panoramic image acquisition unit preferably contains digitizing circuitry that converts the panoramic annular images into a form suitable for processing on a computer. The output of the panoramic image acquisition unit can be used directly or stored in a suitable medium (tape, CD-ROM, DVD-ROM, etc) and retrieved for later use. The panoramic annular lens described in the '763 patent comprises a compact assembly of several reflecting and refracting surfaces. It generates a distorted, donut-shaped annular image as illustrated in FIG. 2 in a vertical cross-sectional view. The panoramic annular lens system has a 360-degree lateral field of view and a vertical field of view that is usually less than 180 degrees. The maximum angle above the horizon is denoted by $\phi_A$ while the minimum angle below the horizon is denoted by $\phi_B$. Points in the real world object space seen at the same vertical (azimuth or elevation) angles above or below the horizon correspond to concentric circles in the panoramic annular image. Similarly, points on lines in the real world object space parallel to the optical axis of the PAL system are projected onto radial lines in the panoramic annular image. As shown in FIG. 2, the panoramic image consists of an annulus bounded by the inner radius, $r_{inner}$ and the outer radius, $r_{outer}$.

Figure 3:
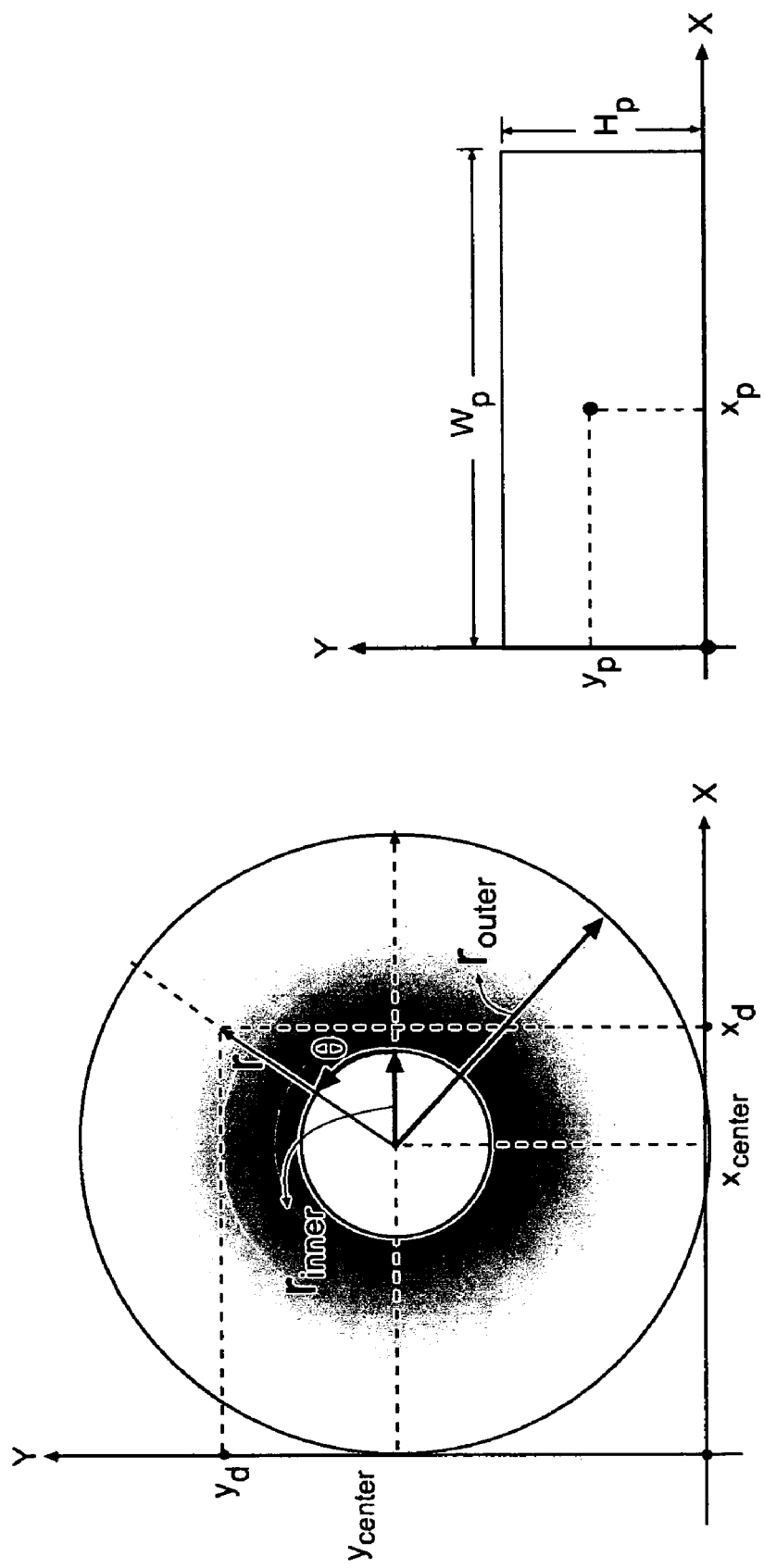
FIG. 3 shows the conversion of the donut-shaped annular image produced by the panoramic annular lens into a 360-degree panorama.

The transform engine 20 receives the output of the panoramic image acquisition unit 10. The transform engine 20 and the panoramic image acquisition unit 10 need not be at the same location. When not at the same location, a suitable transport medium such as broadband streaming over the Internet can be used to transmit the panoramic image or video data to the transform engine 20. The ultimate goal of the transform engine 20 is the creation of a spherical environment map from the panoramic image or video from the panoramic image acquisition unit 10. First, the transform engine extracts the panoramic image from each image frame received from the panoramic image acquisition unit. The polar to rectilinear coordinate transformation illustrated in FIG. 3 (in which both the donut-shaped input image and the 360-degree panorama are shown in 2-dimensional X-Y space) is used to accomplish this. As FIG. 3 shows, the point on the panorama with rectilinear coordinates $x_p$ and $y_p$ corresponds to the point with polar coordinates r and θ, and rectilinear coordinates $x_d$ and $y_d$ on the donut-shaped input image. In FIG. 3, $x_{center}$ and $y_{center}$ are the rectilinear coordinates of the center of the input donut-shaped image while $W_p$ and $H_p$ are the width and height, respectively, of the panorama. Equations (1) to (4) accomplish the required transformations. The video attributes at the ($x_d$, $y_d$) point on the donut-shaped image are then copied onto the ($x_p$, $y_p$) point on the 360-degree panorama—possibly applying interpolation to smoothen the output.

$$\theta = \frac{2\pi}{W_p} x_p \quad (1)$$

$$r = r_{inner} + \left(\frac{r_{outer} - r_{inner}}{H_p}\right) y_p \quad (2)$$

$$x_d = x_{center} + r\cos(\theta) \quad (3)$$

$$y_d = y_{center} + r\sin(\theta) \quad (4)$$

The determination of the $x_{center}$, $y_{center}$, $r_{inner}$ and $r_{outer}$ parameters (calibration of the input panoramic image) can be done interactively by implementing a software means for clicking and dragging representations of the parameters to the correct positions or by means of an automatic calibration procedure.

Figure 4:
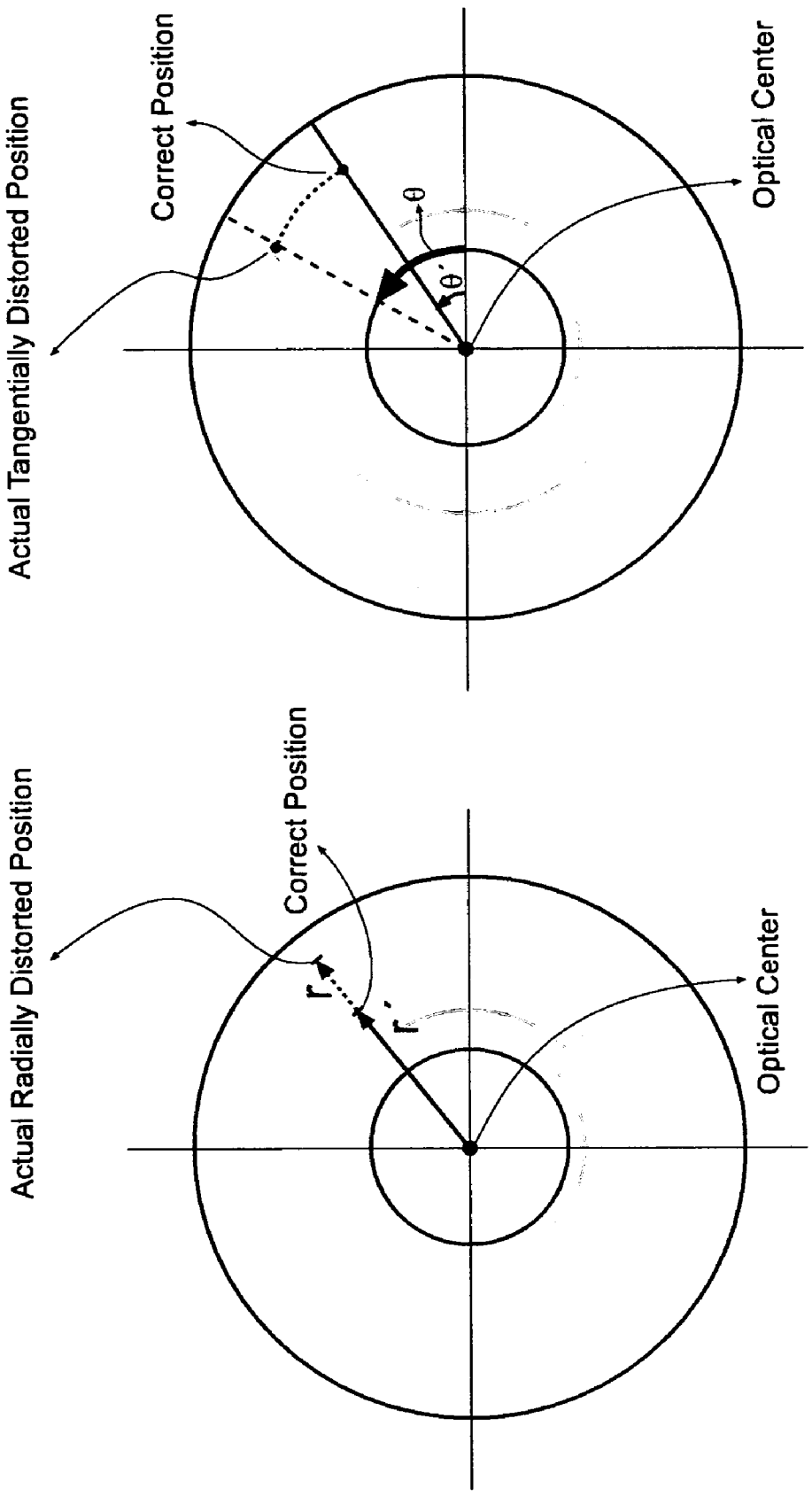
FIG. 4 is a conceptual representation of the distortion model used to correct both tangential and radial distortions in the panoramic annular image.
Figure 5:
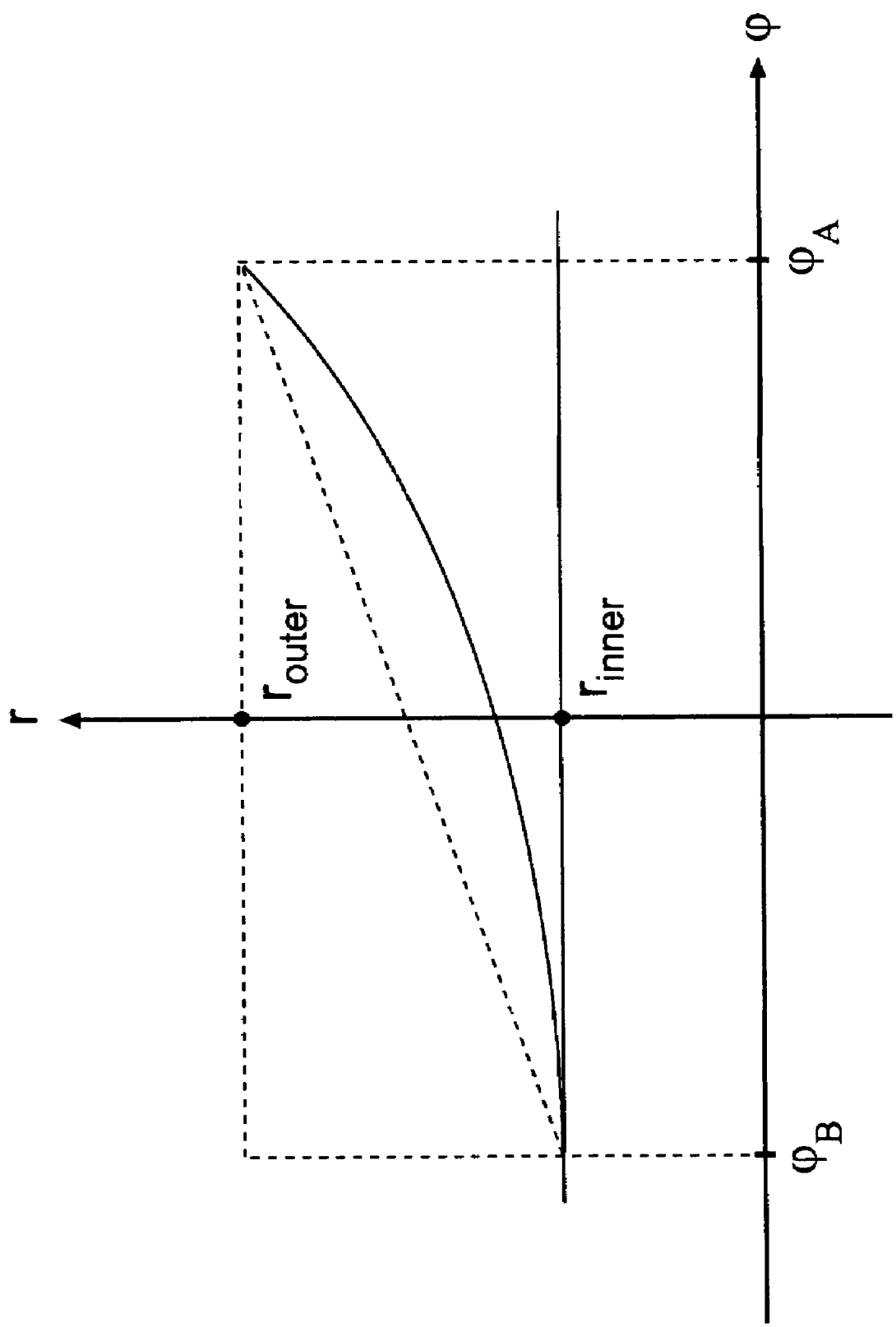
FIG. 5 shows the shape of the radial distortion function for the panoramic annular lens system shown in FIG. 2.

Automatic calibration can be achieved by first converting the input panoramic image into a 256-level gray-scale image, applying a Laplace edge enhancing filter of suitable dimension (a 3- or 5-order Laplace edge enhancing filter has been found to be sufficient in practice) to the resulting gray-scale image. Next, the edge-enhanced image is converted into a binary image using a suitable threshold. At this stage it is relatively straightforward to find the circles defined by the inner and outer radii of the panoramic image. A simple way to find the outer circle is to select three widely spaced points that lie on the circle by starting out at three of the four corners of the edge-enhanced panoramic image and moving inwards until the difference between consecutive pixel intensities exceeds a set threshold. This would indicate the boundary between the outer circle and the surrounding pixels. A circle can then be fitted through the three points. A more sophisticated method would be to obtain a set of points on the boundary by starting out at designated points on the edges of the panoramic image and then calculating the convex hull of the set of points to find the outer circle. The center of either the outer or inner circle is obviously the center of the panoramic image. Once the outer circle has been found, the inner circle can be found using the same procedure as was used for the outer circle but this time starting out from the outer circle instead of from the edges of the edge-enhanced panoramic image. Due to noise and other imperfections in the input panoramic image, the automatic calibration procedure does not always yield perfect results and it might be necessary to augment it with the interactive approach described earlier. Equations (1) to (4) assume linearity in the mapping between lateral and vertical (azimuth or elevation) angles in the real world scene and the distorted panoramic annular image generated by the panoramic annular lens. In most practical lenses of this nature, however, the mapping between the azimuth or elevation angle φ in the real world scene and the radius r in the image produced by the panoramic annular lens system is characterized by significant non-linear distortion. Equation (5) represents the relationship between the azimuth or elevation angle φ in the real world scene and the radius r in the image produced by the panoramic annular lens system. For most practical panoramic annular lens systems, f is a non-linear function. The present invention teaches a polynomial-based interpolation means of correcting the non-linear distortion of the panoramic annular lens system by finding the function f. FIG. 4 and FIG. 5 together illustrate the model of the tangential (in the lateral angle) and radial (in the vertical angle or azimuth) distortions used in the present invention. In FIG. 4, r represents the radius of the correct position, r the radius of the distorted position. Similarly, θ represents the correct lateral angle, θ the distorted lateral angle. The goal is to find a function that fits data characterizing the non-linear distortion of the panoramic annular lens system. FIG. 5 illustrates the shape of the radial distortion function of the panoramic annular lens system shown in FIG. 2. The straight line, drawn for comparison, indicates the shape the function would have taken in the absence of non-linear distortion.

$$r = f(\phi) \quad (5)$$

Figure 6:
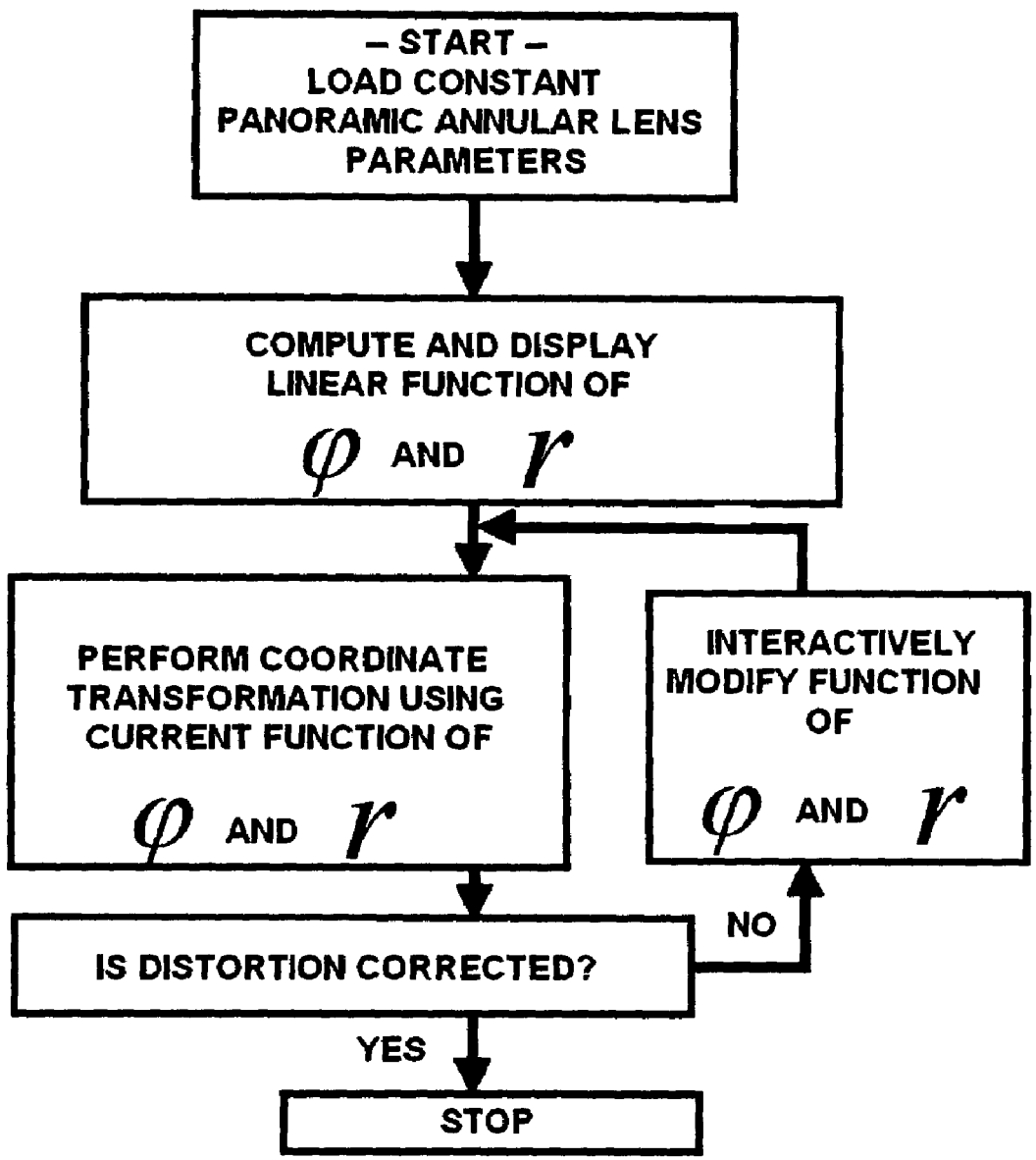
FIG. 6 is a flowchart of an algorithm for interactively correcting the non-linear radial distortion of the panoramic annular lens system.

The transform engine 20 preferably implements software means of displaying the distortion function in the manner shown in FIG. 5 and permitting the user to interactively change the shape of the function, for example, by clicking and dragging points on the graph of the function. The transform engine 20 uses a polynomial or sets of polynomials of suitable degree to correct the non-linear distortion. Cubic spline interpolation can be used in most cases but higher order polynomials could be used when necessary. Cubic spline interpolation and other polynomial interpolation techniques are very widely used and described in the scientific literature. FIG. 6 is a flowchart of an algorithm implemented by the transform engine 20 for the purpose of interactively correcting the non-linear radial distortion of the panoramic annular lens system. The algorithm can equally be applied to the correction of the tangential distortion but this is usually not required since most panoramic annular lens systems are free from any significant tangential distortion. For the purpose of determining when the distortion has been adequately corrected, a single panoramic image containing a vertical column of regularly spaced dots can be used in the interactive process shown in FIG. 6. When the dots are also linearly spaced in the output panorama, the distortion is adequately corrected. The use of this interactive distortion correction method permits an arbitrary panoramic annular lens system with an arbitrary distortion pattern to be used to acquire panoramic images. The parameters representing the distortion profile of the lens can be combined with constant panoramic annular lens parameters such as the vertical field of view and stored in a concise model of the panoramic annular lens system that can later be applied to all panoramic images acquired with the panoramic annular lens system.

Figure 7:
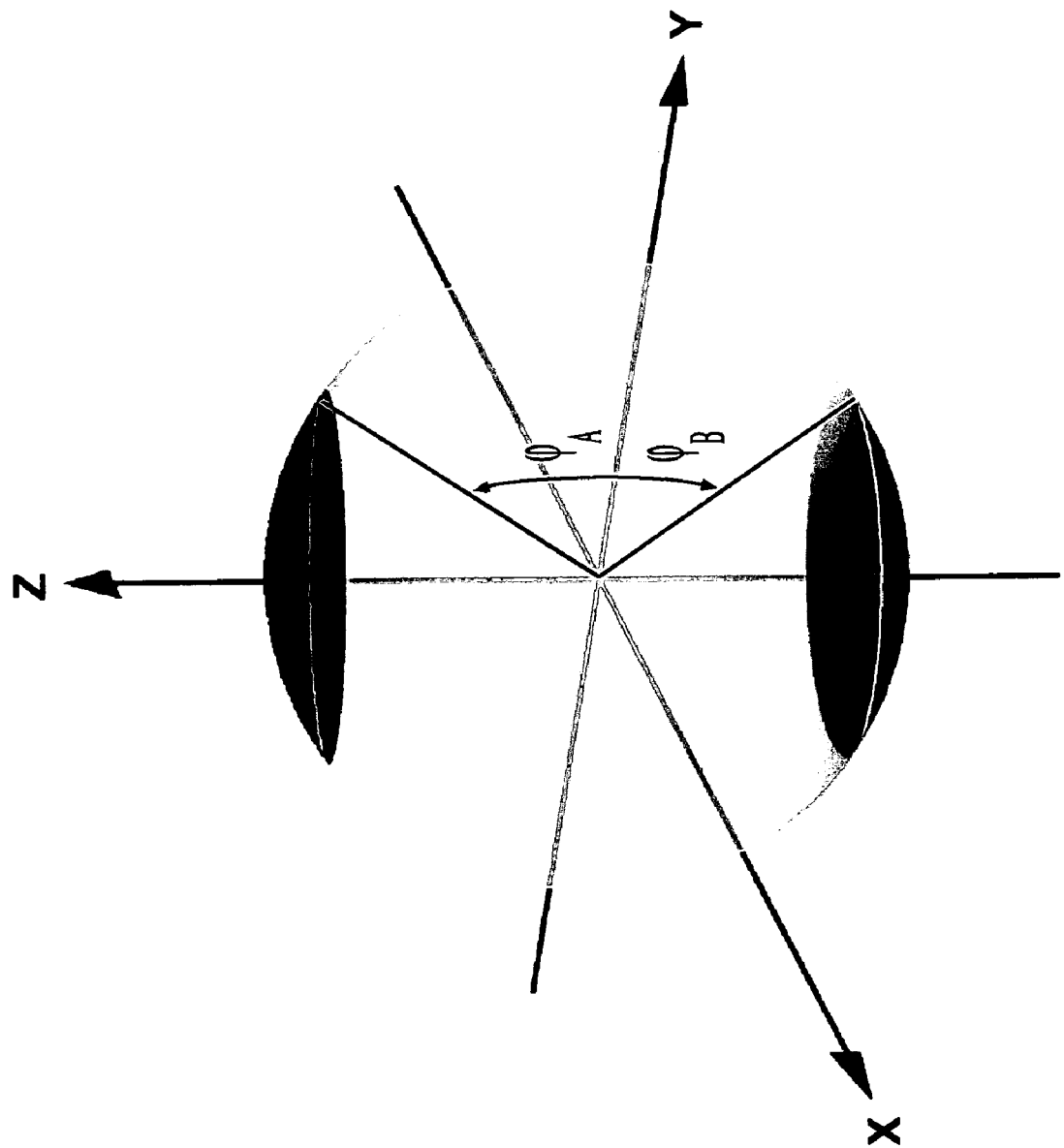
FIG. 7 illustrates the representation of the 360-degree panorama on the surface of a sphere to form a spherical environment map.

Once the panorama is extracted from the donut-shaped image, the transform engine 20 represents the panorama on the surface of a sphere as a spherical environment map in 3-dimensional X-Y-Z space as shown in FIG. 7. In the spherical environment map of FIG. 7, the X-Y plane intersects the panorama along the line corresponding to the horizon with an azimuth or elevation angle of 0 degrees. This arrangement permits a panorama acquired from a panoramic annular lens system with an asymmetrical vertical field of view ($\phi_A$ is not equal to $\phi_B$) to be rendered correctly in the spherical environment map. Since the vertical field of view of most practical panoramic annular lens systems is less than 180 degrees, useful information such as advertising material or the logo of a company can be placed in the unoccupied parts (top and bottom) of the spherical environment map. Although the radius of the sphere can be chosen arbitrarily (since the source panoramic image has no depth information), it could be set to $$\frac{W_p}{2\pi}$$

to avoid scaling of the input panoramic image data. The transform engine 20 also permits the importation of spherical or cylindrical environment maps and performs any coordinate transformations necessary to create a spherical environment map out of the imported environment map.

The major function of the package generator 30 is the creation of interactive virtual tour packages from one or several spherical environment maps created by the transform engine 20. The package generator 30 and the transform engine 20 can be combined into a single virtual tour authoring unit 40, implemented in software, and providing a means of storing, retrieving and editing the virtual tour packages. The virtual tour package can be arranged as a series of interconnected or linked spherical environment maps with information describing how the individual spherical environment maps are interconnected or linked and additional information specifying multimedia content (audio, video, etc) to rendered in response to the activation of interactively defined regions of the spherical environment maps. The virtual tour authoring unit 40 could implement a universal file format for storing virtual tour packages. Such a universal file format would specify a header identifying the file type and containing information as to the number, types, locations and sizes of the elements it contains. Elements could be spherical environment maps containing the panoramic image scenes and rendering information as well as additional information regarding any additional multimedia content embedded in the spherical environment map. Each element in the file is in turn is described by a header specifying the type of the element, its size and any relevant data or attributes and the types, locations and sizes of any additional elements it contains. By making use of self-describing elements in the manner explained in the foregoing, the universal file format would be able to store an arbitrary element having an arbitrary number and types of other such elements embedded in it.

Figure 8A:
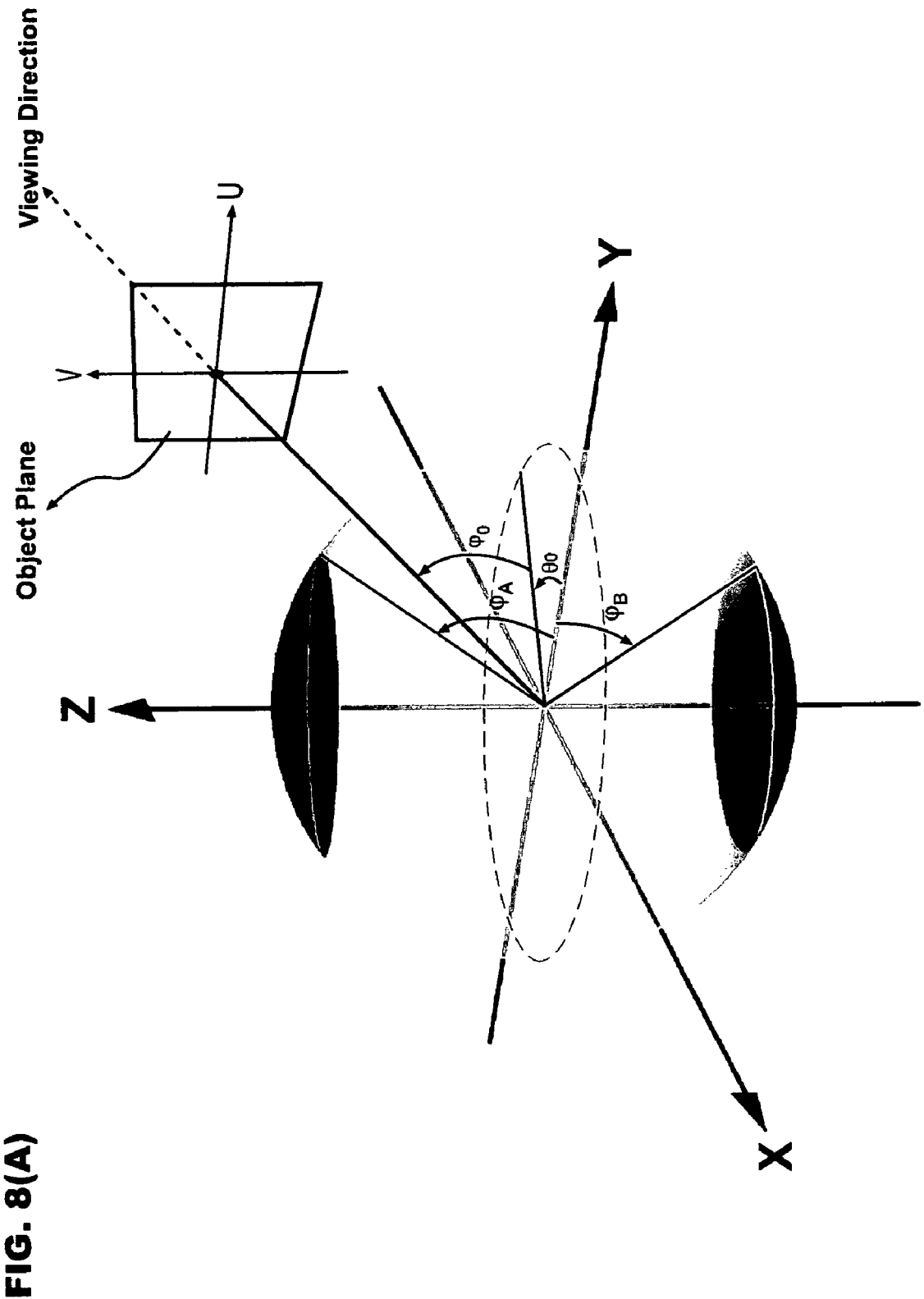
FIG. 8(A) and FIG. 8(B) together show how an undistorted view window is constructed from an arbitrarily selected portion of the spherical environment map.
Figure 8B:
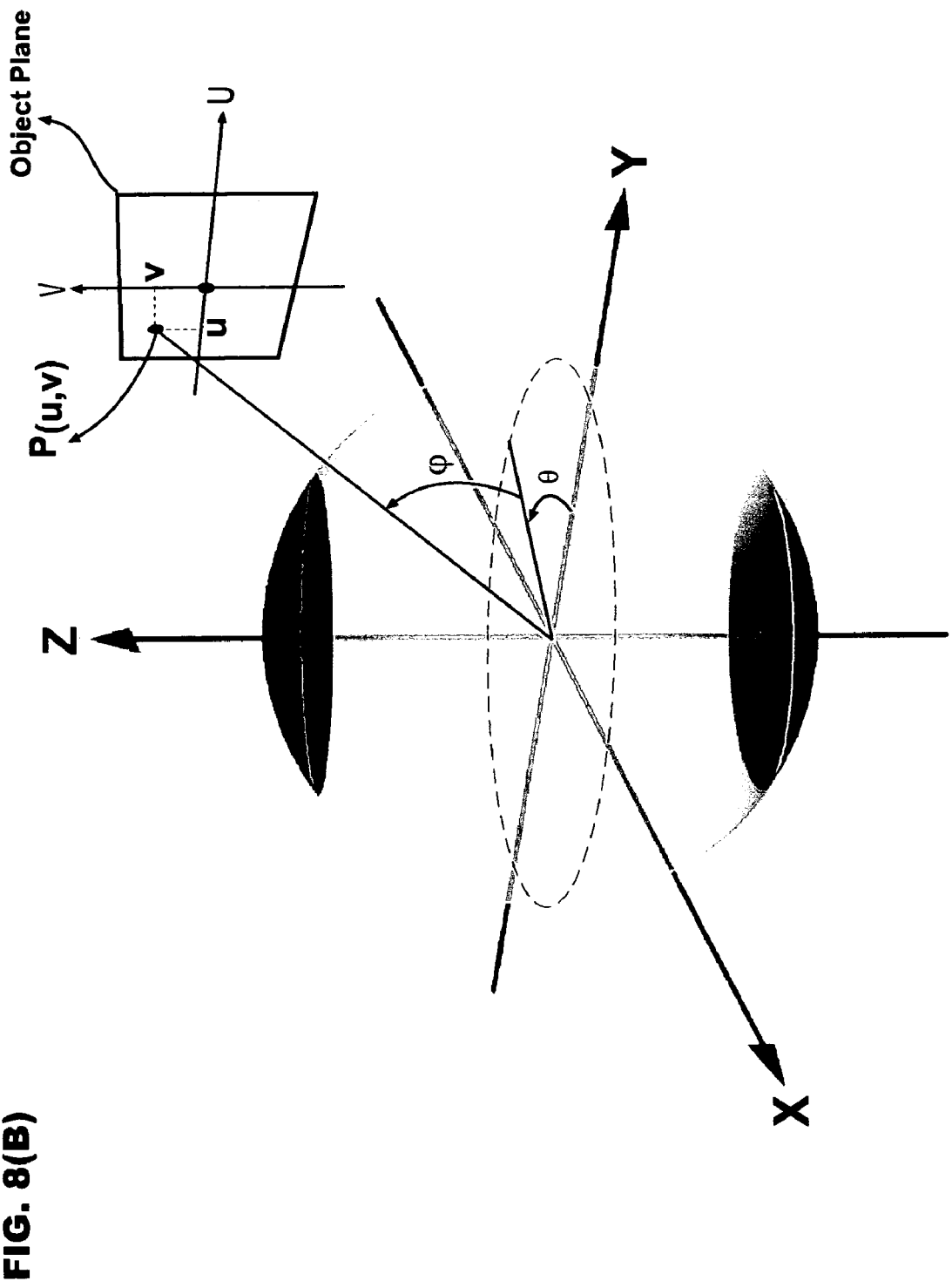

Once the virtual tour package has been created, it can be exported to the viewing engine 50. The viewing engine 50 can be implemented in the same computer software as the virtual tour authoring unit 40 or separately as a stand-alone software or hardware component. More specifically it can be implemented as Sun Microsystem's Java (hereinafter referred to simply as Java) or Microsoft Corporation's ActiveX (hereinafter referred to simply as ActiveX)-based software components that can be embedded in web pages and viewed by a web browser. The viewing engine 50 provides a means for the user to interactively select a particular spherical environment map from the virtual tour package and specify viewing parameters such as a lateral angle $\theta_0$, a vertical (elevation or azimuth) angle $\phi_0$ and a magnification coefficient m. These view parameters together with a view window onto which perspective-corrected views of the spherical environment map are rendered specify a region-of-interest on the spherical environment map that is projected onto a perspective-corrected object plane as shown in FIG. 8(A) and FIG. 8(B) in which the spherical environment map is represented in 3-dimensional X-Y-Z space. When the viewing engine 50 is implemented in computer software, the viewing parameters can be entered using the mouse, keyboard, joystick or any other suitable input device. Equations (6) and (7) describe the transformations required to create the perspective-corrected view. In equations (6) and (7) as in FIG. 8(A) and FIG. 8(B), u and v are the coordinates of a point on the perspective-corrected U-V object plane (the point P(u, v) in FIG. 8(B)) while $\theta$ and $\phi$ are the corresponding lateral and azimuth angles on the spherical environment map for the viewing parameters $\theta_0$, $\phi_0$ and the magnification coefficient m.

$$\theta = \theta_0 + \tan^{-1}\left(\frac{u}{m\cos(\varphi) - v\sin(\varphi)}\right) \tag{6}$$

$$\varphi = \varphi_0 + \sin^{-1}\left(\frac{m\sin(\varphi) - v\cos(\varphi)}{\sqrt{m^2 + u^2 + v^2}}\right) \tag{7}$$

Compared with the approaches used by the prior art, equations (6) and (7) provide a faster means of constructing perspective-corrected views from spherical environment maps while providing full pan, tilt and zoom controls. Creating a look-up table containing a subset of points from the perspective-corrected window, using equations (6) and (7) on the points in the look-up table only and then using bilinear interpolation to correct all other points not in the look-up table leads to faster albeit less accurate perspective correction.

The perspective-corrected view generated by the viewing engine 50 is then displayed on a suitable display device 70 such as a computer monitor or head-mounted display.

Figure 9:
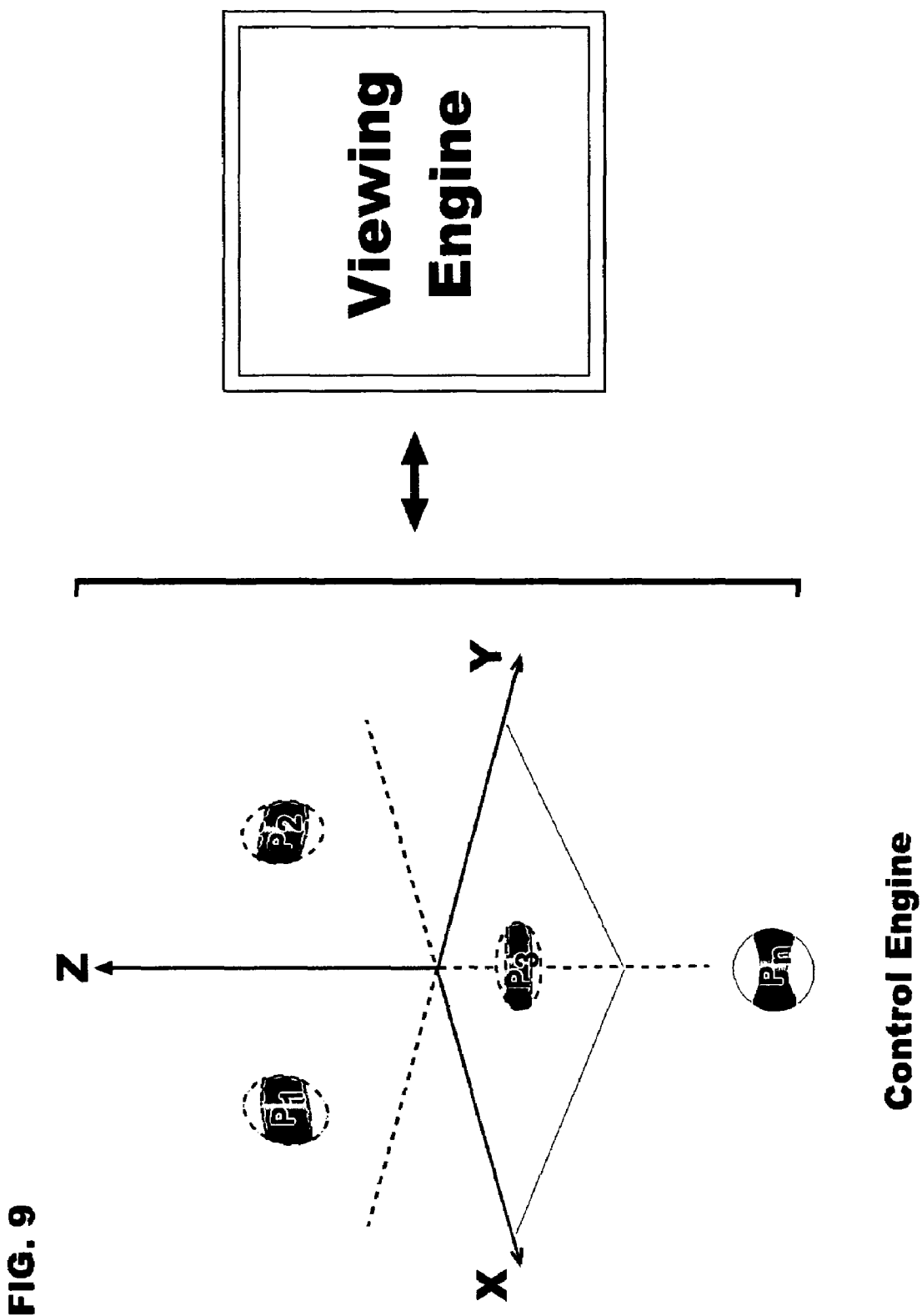
FIG. 9 is a conceptual representation of an embodiment of the control engine and its interconnection with the viewing engine.
Figure 10:
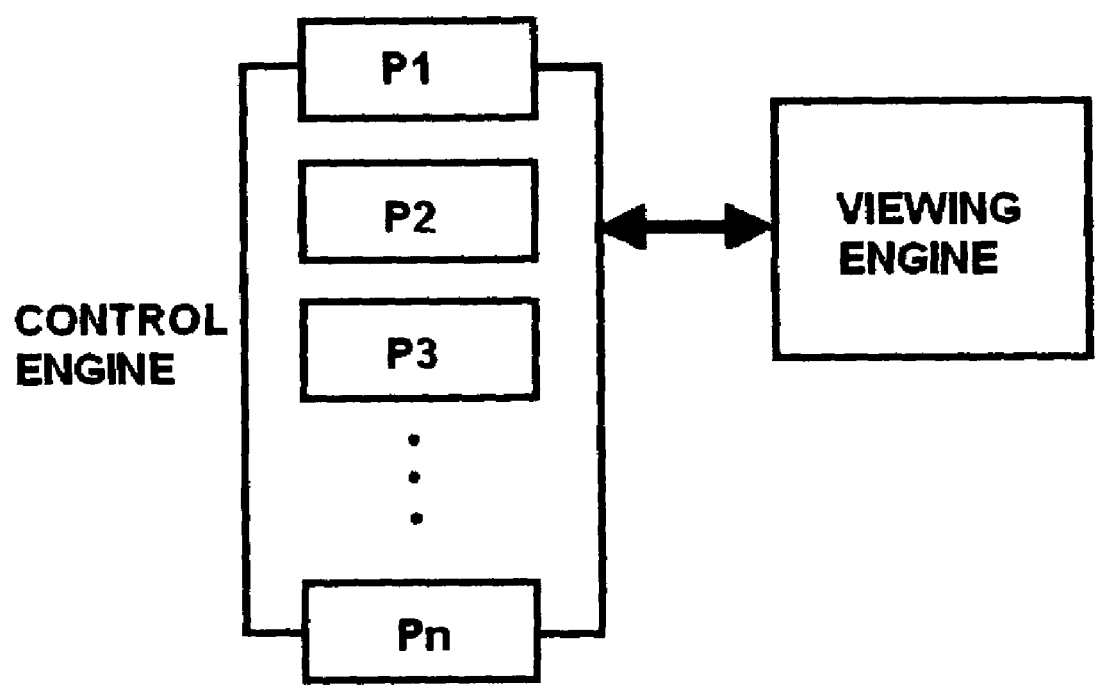
FIG. 10 is a conceptual diagram illustrating another embodiment of the control engine and its interconnection with the viewing engine.

As a means of permitting a higher level of interactivity with the virtual tour package, the control engine 60 is connected operatively to the viewing engine 50 and provides additional means of interaction with the virtual tour package. In particular, the control engine 60 permits any spherical environment map to be selected from the virtual tour package and sends signals to the viewing engine 50 that cause the viewing engine 50 to permit the interactive navigation of the selected spherical environment map. The control engine 60 also indicates which spherical environment map is currently selected and what portion of the selected spherical environment map is currently displayed in the perspective-corrected view window. Furthermore, the control engine 60 permits the interactive selection of any portion of any spherical environment map in the virtual tour package for viewing and transmits the corresponding viewing parameters to the viewing engine 50—causing the viewing engine 50 to render the indicated view. The control engine 60 and the viewing engine 50 communicate bi-directionally. The control engine 60 represents spherical environment maps in preview form. That is, it provides enough information for adequate identification of any spherical environment map but does not store the entire spherical environment map itself. Accordingly, the control engine 60 is preferably implemented as a set of software components displaying in 3- or 2-dimensional space previews (such as thumbnail images) of the spherical environment maps in the virtual tour package. The preview data for the control engine 60 is created by the package generator 30 or the virtual tour authoring unit 40 comprising both the transform engine 20 and the package generator 30. A specific implementation of the control engine 60 is as a set of Java or ActiveX software components each displaying a thumbnail image or video of a spherical environment map or a floor plan or map representing the scene contained in the virtual tour package. Input (mouse, keyboard, etc) from the user can be used to select any spherical environment map for viewing by the viewing engine 50 and then signals from the viewing engine can be used to indicate the selected spherical environment map and what portion of the selected spherical environment map is currently viewed. If the viewing engine is also implemented as a Java or ActiveX component and embedded in the same or different web page as the control engine 60, scripting instructions (for example in JavaScript) can be used to implement the communication between the control engine 60 and the viewing engine 50. The control engine 60 need not be in the same location as the viewing engine 50. FIG. 9 is an embodiment of the control engine 60 in which the previews of the spherical environment maps are displayed in 3-dimensional X-Y-Z space. In FIG. 9, $P_1, P_2, P_3, \ldots, P_n$ are preview elements. The control engine 60 could be configured so that clicking on any of the preview elements causes the viewing engine to display the spherical environment map represented by the preview element. The preview elements could themselves be arranged in a manner indicative of the relative distances from each other of the scenes represented by the corresponding spherical environment maps. Many other arrangements that do not deviate from the scope of the present invention exist. FIG. 10 is another embodiment of the control engine 60 in which the previews of the spherical environment maps are displayed in 2-dimensional space. In FIG. 10 as in FIG. 9, $P_1, P_{2, P3}, \ldots, P_n$ are preview elements. This arrangement could be used for example when the control engine 60 is implemented as a set of Java or ActiveX components embedded in the same web page as the viewing engine 50.

Although the foregoing description of the preferred embodiments of the present invention mentions specific devices and algorithms, it should be apparent to one of ordinary skill in the art that numerous alternative embodiments and equivalents including a computer-usable medium storing computer executable instructions for implementing the disclosed method, exist that do not depart from the present invention.

More generally, the present invention is directed towards a vastly improved method and apparatus for creating, managing and publishing virtual tours.

According to the principles of the present invention, the data used to create virtual tours can be augmented with additional data such as audio, video, text, graphics, pointers to local and/or distributed resources such as web pages, images, audio, video, other virtual tours, etc, to provide a richer user experience. The panoramic data is not limited to data acquired from the aforementioned class of panoramic imaging systems but can be generated using other systems capable of producing panoramic data. Further, the panoramic data need not be represented as spherical environment maps but could be represented in any desired format. The data could be multi-dimensional (e.g. 3D or stereoscopic panoramic video with a time dimension, 3D or 2D panoramic scenes comprising still images, standard video, standard or directional audio, global positioning system (GPS) data, holographic data, infrared data, ultrasonic data, ultraviolet data, etc) and could be acquired using any panoramic imaging system or could be created from the combination of a plurality of conventional images. In particular, panoramic data could be acquired using at least one spherical image/video acquisition unit comprising at least one grid of one or more photosensitive elements on a surface with a spherical geometry or an approximation thereto and at least one enclosing concentric grid of one or more focusing elements on a surface with a spherical geometry or an approximation thereto. The photosensitive unit could comprise a grid of CCD sensors, CMOS sensors, a combination of these and other sensors (e.g. acoustical sensors) or any other suitable set or combination of sensors. The focusing element unit could comprise a grid of one or more lenses capable of focusing images and video from substantially all directions or only a subset of directions surrounding the device. Other arrangements, including, but not limited to, an arrangement requiring optical or alternative transmission of the light rays corresponding to the images or video from the focusing unit to the sensor or detector unit, are also possible. Panoramic data and virtual tour data could also be acquired using at least one versatile device for creating representations of stimuli covering substantially all directions or only a subset of directions around a given reference or view point, said versatile device for creating representations of stimuli comprising at least one grid of one or more focusing elements disposed on an N-dimensional and arbitrarily shaped surface, at least one grid of one or more sensor elements disposed on an N-dimensional and arbitrarily shaped surface, and optionally, at least one grid of one or more stimulus guide elements disposed on an N-dimensional and arbitrarily shaped surface, wherein said focusing element grid is adapted to focus stimuli covering substantially all directions around a given reference or view point onto the sensor element grid and may optionally do so via the stimulus guide unit if necessary, wherein each focusing element or group of focusing elements is associated with and focuses a subset (typically the subset impinging on it) of the entire stimulus space onto a sensor element or group of sensor elements responsive to the stimuli, wherein when an optional stimulus guide element grid is provided, the focusing element grid can be adapted to focus the stimuli onto the stimulus guide element grid for suitable formatting and onward transmission to the sensor element grid, wherein when used, each stimulus guide element or group of elements is associated with and receives stimuli from a focusing element or group of focusing elements and is in turn associated with and transmits stimuli to a sensor element or group of sensor elements. N can be chosen to be 1, 2, 3, or any other suitable quantity. The use of the versatile data acquisition device or method of the present invention permits easier and more flexible manufacturing or assembly of data acquisition systems. Using the versatile data acquisition device, panoramic imaging systems that eliminate the spatial and temporal discontinuities and many other shortcomings of existing panoramic imaging systems could easily be built. Furthermore, other types of sensors could be incorporated into the versatile device to simultaneously capture other useful data such as audio for the creation of super-rich and truly immersive virtual tours.

Efficient transfer of the data from the panoramic data acquisition unit or step to the transform engine or step, package generator or package generation step, viewing engine or viewing step, control engine or control step and/or display means or display step could be achieved by using relevant parameters such as those obtained via user feedback. More specifically, feedback containing such information as the user's current view parameters or the current state of the transform engine or step, the package generator or package generation step, the viewing engine or viewing step, the control engine or control step and/or the display means or display step could be used to predict what portion of the data needs to be transferred next. Once the portion of the data that needs to be transferred next has been so predicted, it can then be prepared and transferred. This could facilitate very efficient use of resources especially if the data is to be transmitted over bandwidth-limited networks such as the Internet. Compression and/or decompression of the data can be carried out at any stage it is deemed necessary. For example, the data could be compressed before transfer from the acquisition unit and then decompressed upon receipt at the transform engine or step, the package generator or package generation step, the viewing engine or viewing step, the control engine or control step and/or the display means or display step. Furthermore, efficient data transfer schemes as like the one described earlier could be incorporated into the compression/decompression scheme.

The transform engine or step could incorporate generic means of correcting distortions (not limited to non-linear geometrical distortions) in the panoramic data and/or optional virtual tour data. When polynomial-based algorithms are used for distortion correction as described in one embodiment of the present invention, interactive distortion correction with the optional display of results could be performed at real time rates and distortion profiles can be built easily, rapidly and accurately. Advanced distortion correction methods such as the use of constructive neural networks—wherein data obtained from calibration patterns captured using the panoramic imaging system for which a distortion profile is desired and a specified error threshold could be used to automatically build and train neural a neural network of suitable complexity to learn the inherent distortions of said panoramic imaging system, wherein said trained neural network is then used to correct distortions in data captured using said panoramic imaging system—could also be employed.

The package generator could be used to create virtual tour packages comprising different types of data with or without panoramic data. Additionally, the data could be sent to the viewing engine, control engine or display with or without transformation and packaging. The package generator could also implement an interface responsive to user input and facilitating the construction of paths or walk-through sequences based on panoramic data and/or additional virtual tour data and commands. Certain regions or volumes (in the case of 3D or higher dimensional data) of the data could be designated active and used to embed hotspots, commands and other pointers that could refer to virtual tour packages, resources on the Internet, panoramic data, etc.

As already explained in the foregoing description of the preferred embodiment of the present invention, the transform engine or step and package generator or package generation step could be combined into a unitary system or implemented as separate components without deviating from the scope of the present invention. More generally, all components could be mixed and matched in unitary or distributed subsystems as appropriate without deviating from the teachings of the present invention.

Virtual tours could comprise simple or complex scenes with multi-dimensional panoramic and non-panoramic data and commands. Optional interconnections between the scenes or data could be specified. Navigation commands could then be built that specify any desired traversals of the scenes or data contained in the virtual tours. Such traversals could be timed. Further, automated traversals could be built—thus making it possible for the virtual tours to be navigated in automatic mode with little or no need for user interaction. Guided tours could also be built this way.

The viewing engine could carry out perspective correction of data when necessary. This could be accomplished by adapting the viewing engine to respond to user input and to use such user input to create perspective corrected views of the portion of the data corresponding to the user input such that the user could navigate the data by changing the input parameters. The process could also be automated by providing a means for the user to define navigation paths that can then be executed by the viewing engine. Perspective correction, when performed, need not be according to the equations specified in the description of the preferred embodiments of the present invention but could be based on any suitable methods or devices. In particular, perspective correction could be achieved by representing the data on a spherical surface and using viewing parameters to project a portion of the surface of the sphere onto a perspective corrected surface such as a 2D rectilinear surface. The viewing engine or step could also be adapted to render non-panoramic data such as conventional still images, video, etc. It could also be adapted to render data in a multi-dimensional fashion. For example, it could render 3D video, 2D video, 2D still images, etc. The viewing engine could be adapted to permit one user to navigate the data and/or to permit a plurality of users to independently and simultaneously navigate the data. Furthermore, the viewing engine could be adapted to permit collaborative, competitive or synchronized navigation of the data by a plurality of users. One embodiment of such a collaborative, competitive or synchronized navigation scheme could be adapted to permit a first user to access the current viewing parameters (and any other relevant data) of one or more other users and to use such data to navigate the data in a predetermined fashion. The other users could also be given simultaneous access to the first user's parameters and could also use such information for the collaborative, competitive or synchronized navigation of the data.

The control engine or step could be adapted to render representative information about all or parts of the virtual tour data, to permit a particular portion to be selected from the virtual tour data and optionally, to send signals to said viewing engine that cause said viewing engine to permit the interactive navigation of said selected portion of said virtual tour, wherein said control engine also indicates or causes to be indicated what portion of said virtual tour is currently selected and what sub-part of said selected portion of said virtual tour is currently rendered, wherein said control engine is responsive to user input and commands from said viewing engine and is in turn capable of modifying said representative information about all or parts of said virtual tour in response to said user input and said commands from said viewing engine and is further optionally capable of communicating information indicative of such externally induced modifications to said user or said viewing engine. Bi-directional communication between the viewing engine and control engine and/or interaction between viewing engine and control engine could provide unprecedented interactivity with the virtual tour and/or permit seamless navigation of the virtual tour. As an illustration, bi-directional communication between the viewing engine and the control engine could permit "instant" loading of a particular virtual tour scene selected via the control engine or via the viewing engine and allow both viewing engine and control engine to be substantially simultaneously updated with the information corresponding to scene selection even when they are implemented as separate embedded components on a web page or on separate web pages. This would eliminate the requirement for a new web page to be loaded either for the control engine or viewing engine as the use of current virtual tour authoring tools would demand in this case. The bi-directional communication between the viewing and control engines or steps therefore allows for seamless navigation of virtual tours and data.

The display is adapted to display data from any combination of the components of the present invention. One or more separate displays could be used depending on the exact configuration of any particular embodiment of the present invention. The display could be a conventional computer monitor, head-mounted display, 3D or stereoscopic display, holographic display or any other suitable display.

Embodiments of the present invention in which the viewing engine or step and control engine or step comprise a unitary structure are possible. Other embodiments in which they are implemented separately are also possible.

It should be understood that various alternatives to the embodiments of the invention described herein may be employed in practicing the invention. Thus, it is intended that the appended claims define the scope of the invention and that methods and structures within the scope of these claims and their equivalents be covered thereby.

What is claimed is:

1. An apparatus for creating, managing and publishing interactive virtual tours, the apparatus comprising:

a panorama data acquisition unit implementing means of capturing panoramic data representing a plurality of environment maps and preparing said panoramic data for further processing, wherein said panoramic data acquisition unit comprises at least one versatile device for creating representations of stimuli covering substantially all directions around a given reference or view point, said versatile device for creating representations of stimuli comprising at least one grid of one or more focusing elements disposed on an N-dimensional shaped surface, at least one grid of one or more sensor elements disposed on an N-dimensional shaped surface, and at least one grid of one or more stimulus guide elements disposed on an N-dimensional shaped surface, wherein said focusing element grid is adapted to focus stimuli covering substantially all directions around a given reference or view point onto the sensor element grid via the stimulus guide unit, wherein each focusing element or group of focusing elements is associated with and focuses a subset of the entire stimulus space onto a sensor element or group of sensor elements responsive to the stimuli, wherein when a stimulus guide element grid is provided, the focusing element grid is adapted to focus the stimuli onto the stimulus guide element grid for formatting and onward transmission to the sensor element grid, wherein when used, each stimulus guide element or group of elements is associated with and receives stimuli from a focusing element or group of focusing elements and is in turn associated with and transmits stimuli to a sensor element or group of sensor elements;

a transform engine responsive to said panoramic data and implementing means of correcting distortions in said panoramic data and/or performing automatic, manual or interactive calibration of said panoramic data and/or transforming said panoramic data into a desired format or set of formats when necessary, wherein said distortion correction is accomplished through steps of:

a) loading data including reference data that could be used to derive panoramic imaging system distortion profiles;

b) specifying a linear or other predetermined distortion function or set of distortion functions and displaying representations of said distortion function or set of distortion functions;

c) using distortion function or set of distortion functions to build a distortion profile for the panoramic imaging system that was used to acquire the reference data;

d) performing transformation on panoramic data using distortion profile specified in c) and displaying results of said transformation;

e) determining whether distortion is satisfactorily corrected;

f) continuing with steps g) and h) if distortion is deemed not to have been satisfactorily corrected and continuing with step i) if distortion is deemed to have been satisfactorily corrected;

g) automatically or interactively modifying the distortion function or set of distortion functions using feedback from displayed distortion function representation or transformation results obtained in step d) or by using data loaded in step a);

h) repeating steps c) to g) until distortion is judged to have been satisfactorily corrected;

i) storing distortion profile obtained in step c) for use in performing transformations on panoramic data acquired using the panoramic imaging system for which data was loaded in step a);

a package generator adapted to generate virtual tour packages containing said panoramic data, commands and/or virtual tour data;

a viewing engine responsive to said panoramic data and/or virtual tour packages and implementing means for perspective correction, and user interaction with, said panoramic data and/or virtual tour data when necessary;

a control engine adapted to facilitate a higher level of interaction with said panoramic data and virtual tour data, wherein said control engine is connected operatively to and communicates bi-directionally with said viewing engine, renders representative information about all or parts of said virtual tour, permits a particular portion to be selected from said virtual tour and sends signals to said viewing engine that cause said viewing engine to permit the interactive navigation of said selected portion of said virtual tour, wherein said control engine also indicates or causes to be indicated what portion of said virtual tour is currently selected and what sub-part of said selected portion of said virtual tour is currently rendered, wherein said control engine is responsive to user input and commands from said viewing engine and is in turn capable of modifying said representative information about all or parts of said virtual tour in response to said user input and said commands from said viewing engine and is further capable of communicating information indicative of such externally induced modifications to said user and said viewing engine;

a display means for rendering output of said viewing engine, control engine, package generator, transform engine, and/or panoramic data acquisition unit.

2. The apparatus of claim 1, wherein said panoramic data acquisition unit is adapted to capture data representing 2D panoramic images or video, 3D or stereoscopic panoramic images or video, holographic data, infrared data, ultrasonic data or ultraviolet data.

3. The apparatus of claim 1, wherein said at least one grid of one or more sensor elements is responsive to electromagnetic radiation.

4. The apparatus of claim 1, wherein said panoramic data acquisition unit comprises a spherical image/video acquisition unit comprising at least one grid of one or more photosensitive elements on a surface with a spherical geometry or an approximation thereto and at least one enclosing concentric grid of one or more focusing elements on a surface with a spherical geometry or an approximation thereto.

5. The apparatus of claim 1, wherein said panoramic data acquisition unit comprises a panoramic imaging system characterized by a 360-degree lateral field of view and a vertical field of view that is usually less than 180 degrees.

6. The apparatus of claim 1, wherein said panoramic data acquisition unit is adapted to capture each complete panoramic data block in a single image/video frame.

7. The apparatus of claim 1, wherein said panoramic data acquisition unit is adapted to capture each complete panoramic data block in a plurality of image/video frames that are combined to form complete panoramic data blocks.

8. The apparatus of claim 1, wherein said associated virtual tour data includes audio, video, text, graphics, pointers to resources on local and distributed networks or virtual tour packages.

9. The apparatus of claim 1, wherein said panoramic data acquisition unit further comprises means of preparing and transferring all or portions of acquired panoramic data to said transform engine, said package generator, said viewing engine, said control engine or said display; wherein said preparation and transfer involves compression and decompression of all or portions of acquired panoramic data; wherein said preparation and/or transfer is in response to user commands or information inferred from the state of said viewing engine or said control engine.

10. The apparatus of claim 1, wherein said transform engine implements means of converting panoramic data from a first format to one or more formats and/or vice versa.

11. The apparatus of claim 10, wherein said panoramic data conversion is between polar and rectilinear coordinates, polar and spherical coordinates, spherical and rectilinear coordinates, cubic and spherical coordinates, cubic and polar coordinates or cubic and rectilinear coordinates.

12. The apparatus of claim 1, wherein said distortion function or set of distortion functions is based on a polynomial or a set of polynomials of suitable degree.

13. The apparatus of claim 1, wherein said package generator implements means of specifying active regions and/or volumes on said panoramic data and/or virtual tour data for programming reference.

14. The apparatus of claim 1, wherein said package generator implements means of specifying navigable paths or walk-through sequences on said panoramic data and/or virtual tour data.

15. The apparatus of claim 14, wherein said navigable paths or walk-through sequences are navigated in automatic or guided mode.

16. The apparatus of claim 1, wherein said panoramic data, virtual tour data, commands, navigable paths or walk-through sequences, virtual tour packages and/or distortion profiles are managed using a universal file format, said universal file format specifying a header identifying the file type and containing information as to the number, types, locations and sizes of elements it contains, wherein each element in the file is in turn described by a header specifying the type of element, its size and any relevant data, commands or attributes and the types, locations and sizes of any additional elements it contains, thus making it possible for arbitrary types and numbers of elements to be managed by said universal file format.

17. The apparatus of claim 1, wherein said viewing engine is responsive to user input and implements means for perspective correction of said panoramic data, navigable paths or walk-through sequences and/or virtual tour packages.

18. The apparatus of claim 1, wherein said viewing engine further implements means of navigating said panoramic data, navigable paths or walk-through sequences and/or virtual tour packages.

19. The apparatus of claim 1, wherein said viewing engine implements means for a single user or a plurality of users to independently and simultaneously interact with and navigate said panoramic data, navigable paths or walk-through sequences and/or virtualitour packages.

20. The apparatus of claim 1, wherein said viewing engine implements means for a plurality of users to interact with and navigate said panoramic data, navigable paths or walk-through sequences and/or virtual tour packages in a collaborative, competitive, coordinated, and/or synchronized manner.

21. The apparatus of claim 1, wherein said representative information rendered by said control engine about all or parts of said virtual tour is rendered in 2D, 3D or higher dimensional space and/or time.

22. The apparatus of claim 1, wherein said viewing engine and control engine comprise a unitary structure.

23. A method of creating, managing and publishing interactive virtual tours, said method comprising:

a panorama data acquisition step is performed by a panoramic image acquisition unit for capturing panoramic data representing a plurality of environment maps and preparing said panoramic data for further processing, wherein said panoramic data acquisition step utilizes at least one versatile device for creating representations of stimuli covering substantially all directions around a given reference or view point, said versatile device for creating representations of stimuli comprising at least one grid of one or more focusing elements disposed on an N-dimensional shaped surface, at least one grid of one or more sensor elements disposed on an N-dimensional shaped surface, and at least one grid of one or more stimulus guide elements disposed on an N-dimensional shaped surface, wherein said focusing element grid is adapted to focus stimuli covering substantially all directions around a given reference or view point onto the sensor element grid via the stimulus guide unit, wherein each focusing element or group of focusing elements is associated with and focuses a subset of the entire stimulus space onto a sensor element or group of sensor elements responsive to the stimuli, wherein when a stimulus guide element grid is provided, the focusing element grid can be adapted to focus the stimuli onto the stimulus guide element grid for formatting and onward transmission to the sensor element grid, wherein when used, each stimulus guide element or group of elements is associated with and receives stimuli from a focusing element or group of focusing elements and is in turn associated with and transmits stimuli to a sensor element or group of sensor elements;

a transform step for correcting distortions in said panoramic data and performing automatic, manual or interactive calibration of said panoramic data and transforming said panoramic data into a desired format or set of formats when necessary, wherein said transform step for correcting distortions is accomplished through steps of:
  a) loading data including reference data that could be used to derive panoramic imaging system distortion profiles;
  b) specifying a linear or other predetermined distortion function or set of distortion functions and displaying representations of said distortion function or set of distortion functions;
  c) using distortion function or set of distortion functions to build a distortion profile for the panoramic imaging system that was used to acquire the reference data;
  d) performing transformation on panoramic data using distortion profile specified in c) and displaying results of said transformation;

e) determining whether distortion is satisfactorily corrected;
f) continuing with steps g) and h) if distortion is deemed not to have been satisfactorily corrected and continuing with step i) if distortion is deemed to have been satisfactorily corrected;
g) automatically or interactively modifying the distortion function or set of distortion functions using feedback from displayed distortion function representation or transformation results obtained in step d) or by using data loaded in step a);
h) repeating steps c) to g) until distortion is judged to have been satisfactorily corrected;
i) storing distortion profile obtained in step c) for use in performing transformations on panoramic data acquired using the panoramic imaging system for which data was loaded in step a);
a package generation step adapted to generate virtual tour packages containing said panoramic data, commands and/or optional virtual tour data;
a viewing step responsive to said panoramic data and/or virtual tour packages and providing means for perspective correction of, and user interaction with, said panoramic data and/or virtual tour data when necessary;
a control step adapted to facilitate a higher level of interaction with said panoramic data and/or virtual tour data, wherein said control step is connected operatively to and communicates bi-directionally with said viewing step, renders representative information about all or parts of said virtual tour, permits a particular portion to be selected from said virtual tour and sends signals to said viewing step that cause said viewing step to permit the interactive navigation of said selected portion of said virtual tour, wherein said control step also indicates or causes to be indicated what portion of said virtual tour is currently selected and what sub-part of said selected portion of said virtual tour is currently rendered, wherein said control step is responsive to user input and commands from said viewing step and is in turn capable of modifying said representative information about all or parts of said virtual tour in response to said user input and said commands from said viewing step and is further capable of communicating information indicative of such externally induced modifications to said user and said viewing step;
a display step providing means for rendering output of said viewing step, control step, package generation step, transform step, and/or panoramic data acquisition step.

24. The method of claim 23, wherein said panoramic data acquisition step is adapted to capture data representing 2D panoramic images or video, 3D or stereoscopic panoramic images or video, holographic data, infrared data, ultrasonic data or ultraviolet data.

25. The method of claim 23, wherein said at least one grid of one or more sensor elements is responsive to electromagnetic radiation.

26. The method of claim 23, wherein said panoramic data acquisition step utilizes a spherical image/video acquisition unit comprising at least one grid of one or more photosensitive elements on a surface with a spherical geometry or an approximation thereto and at least one enclosing concentric grid of one or more focusing elements on a surface with a spherical geometry or an approximation thereto.

27. The method of claim 23, wherein said panoramic data acquisition step utilizes a panoramic imaging system characterized by a 360-degree lateral field of view and a vertical field of view that is usually less than 180 degrees.

28. The method of claim 23, wherein said panoramic data acquisition step is adapted to capture each complete panoramic data block in a single image/video frame.

29. The method of claim 23, wherein said panoramic data acquisition step is adapted to capture each complete panoramic data block in a plurality of image/video frames that are combined to form complete panoramic data blocks.

30. The method of claim 23, wherein said virtual tour data includes audio, video, text, graphics, pointers to resources on local and distributed networks or virtual tour packages.

31. The method of claim 23, wherein said panoramic data acquisition step further comprises providing means of preparing and transferring all or portions of acquired panoramic data to said transform engine, said package generator, said viewing engine, said control engine or said display; wherein said preparation and transfer means involves compression and decompression of all or portions of acquired panoramic data; wherein said preparation and transfer means is in response to user commands or information inferred from the state of said viewing engine or said control engine.

32. The method of claim 23, wherein said transform step implements means of converting panoramic data from a first format to one or more formats and/or vice versa.

33. The method of claim 32, wherein said panoramic data conversion is between polar and rectilinear coordinates, polar and spherical coordinates, spherical and rectilinear coordinates, cubic and spherical coordinates, cubic and polar coordinates or cubic and rectilinear coordinates.

34. The method of claim 23, wherein said distortion function or set of distortion functions is based on a polynomial or a set of polynomials of suitable degree.

35. The method of claim 23, wherein said package generation step implements means of specifying active regions and/or volumes on said panoramic data and/or virtual tour data for programming reference.

36. The method of claim 23, wherein said package generation step implements means of specifying navigable paths or walk-through sequences on said panoramic data and/or virtual tour data.

37. The method of claim 36, wherein said navigable paths or walk-through sequences are navigated in automatic or guided mode.

38. The method of claim 23, wherein said panoramic data, virtual tour data, commands, navigable paths or walk-through sequences, virtual tour packages and/or distortion profiles are managed using a universal file format, said universal file format specifying a header identifying the file type and containing information as to the number, types, locations and sizes of elements it contains, wherein each element in the file is in turn described by a header specifying the type of element, its size and any relevant data, commands or attributes and the types, locations and sizes of any additional elements it contains, thus making it possible for arbitrary types and numbers of elements to be managed by said universal file format.

39. The method of claim 23, wherein said viewing step is responsive to user input and implements means for perspective correction of said panoramic data, navigable paths or walk-through sequences and/or virtual tour packages.

40. The method of claim 23, wherein said viewing step further implements means of navigating said panoramic data, navigable paths or walk-through sequences and/or virtual tour packages.

41. The method of claim 23, wherein said viewing step implements means for a single user or a plurality of users to independently and simultaneously interact with and navigate said panoramic data, navigable paths or walk-through sequences and/or virtual tour packages.

42. The method of claim 23, wherein said viewing step implements means for a plurality of users to interact with and navigate said panoramic data, navigable paths or walk-through sequences and/or virtual tour packages in a collaborative, competitive, coordinated, and/or synchronized manner.

43. The method of claim 23, wherein said representative information rendered by said control step about all or parts of said virtual tour is rendered in 2D, 3D or higher dimensional space and/or time.

44. The method of claim 23, wherein said viewing step and control step are implemented in a unitary structure.

* * * * *